US008633799B1

(12) United States Patent
Aronson et al.

(10) Patent No.: US 8,633,799 B1
(45) Date of Patent: *Jan. 21, 2014

(54) LOCK WITH REMOTELY ACTIVATED LOCKOUT FEATURE

(76) Inventors: Glen L. Aronson, San Clemente, CA (US); John Wollam, Vancouver, WA (US)

( * ) Notice: Subject to any disclaimer, the term of this patent is extended or adjusted under 35 U.S.C. 154(b) by 606 days.

This patent is subject to a terminal disclaimer.

(21) Appl. No.: 12/973,712

(22) Filed: Dec. 20, 2010

Related U.S. Application Data

(63) Continuation-in-part of application No. 11/821,700, filed on Jun. 25, 2007, now Pat. No. 7,880,585.

(51) Int. Cl.
*B60R 25/00* (2013.01)

(52) U.S. Cl.
USPC ............ 340/5.73; 340/5.64; 705/16; 705/18; 705/28; 705/304; 705/307

(58) Field of Classification Search
USPC .................. 340/5.64, 5.73, 825.17
See application file for complete search history.

(56) References Cited

U.S. PATENT DOCUMENTS

| 5,222,076 | A | * | 6/1993 | Ng et al. ........................ 375/223 |
| 5,406,257 | A | * | 4/1995 | Saito ............................. 340/542 |
| 5,510,780 | A | * | 4/1996 | Norris et al. ................. 340/5.42 |
| 5,587,702 | A | * | 12/1996 | Chadfield ..................... 340/542 |
| 6,130,605 | A | * | 10/2000 | Flick ......................... 340/426.23 |
| 6,344,796 | B1 | * | 2/2002 | Ogilvie et al. ............. 340/568.1 |
| 6,420,971 | B1 | * | 7/2002 | Leck et al. ................... 340/542 |
| 2002/0103724 | A1 | * | 8/2002 | Huxter ........................... 705/28 |
| 2002/0186144 | A1 | * | 12/2002 | Meunier ................. 340/825.28 |
| 2003/0107498 | A1 | * | 6/2003 | Drennan ................. 340/825.28 |

* cited by examiner

*Primary Examiner* — Brian Zimmerman
*Assistant Examiner* — Omer S Khan

(57) ABSTRACT

A method for controlling access to a storage unit owned by an owner, wherein a renter has access to the storage unit unless the owner receives the legal right to deny the renter access to the storage unit and decides to do so. In this method, the storage unit is secured by a lock that is, at least in part, controlled by the renter. A remotely controllable lockout assembly, however, is capable of over locking the storage unit so that the renter can no longer gain entry when the lockout assembly is activated. The method includes remotely controlling the lockout assembly to deny the renter access to the unit when the owner receives the legal right to deny the renter access to the storage unit and decides to do so.

14 Claims, 4 Drawing Sheets

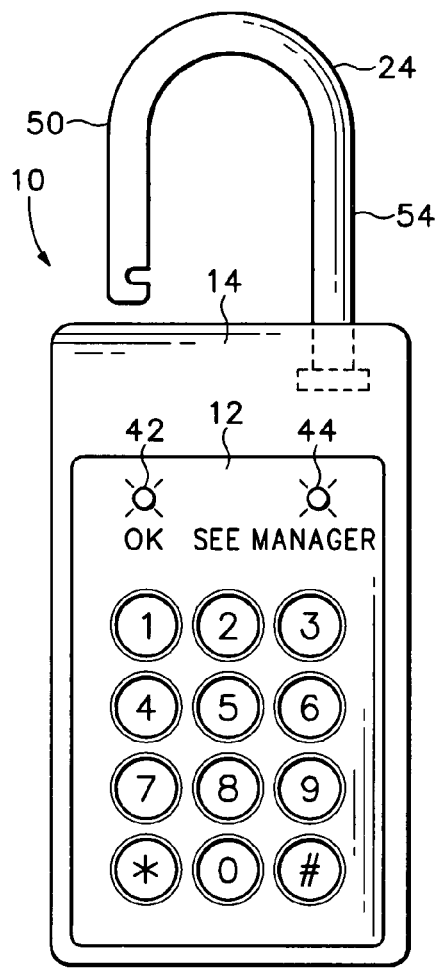
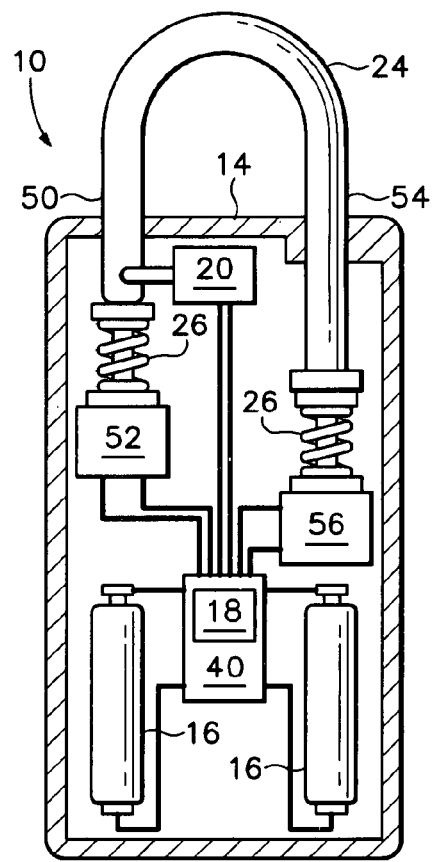
FIG.1
FIG.2

LOCK WITH REMOTELY ACTIVATED LOCKOUT FEATURE

RELATED APPLICATION

This application is a continuation-in-part of application Ser. No. 11/821,700, filed Jun. 25, 2007, which is a continuation of Ser. No. 10/174,714 now U.S. Pat. No. 7,236,085, filed Jun. 18, 2002. The complete disclosure of these applications are incorporated here by reference for all purposes.

BACKGROUND

Self-storage units, in the United States, are typically rented on a monthly basis with the rent for each month being due on the first day of that month. If the rent is not paid by the tenth day of the month, the owner of the facility gains the legal right to lock out the renter, so that the renter no longer has access to the storage unit. Accordingly, on the eleventh day of each month, the manager of a self-storage facility typically has the task of walking around the facility and over locking all of the units for which the renter of the unit has not paid his rent for the current month. This is done by placing an additional lock on the storage unit door, through a hasp specially set for this purpose. For a large facility with hundreds of storage units this task can take two to four hours.

Another characteristic of self-storage facilities is that they are typically fenced and gated. The gate is controlled by a keypad that is linked to a computer. Each renter is associated with a key sequence that the renter enters into the keypad in order to enter and exit the facility. The computer notes the renter's presence in the facility. The computer to which the keypad is linked typically runs a computer program specially designed for facilitating the management of a self-storage facility. When a renter pays his or her rent, this information is logged into the computer. Accordingly, on the eleventh day of the month it is a simple matter to obtain a list of unit numbers for which the rent has not been paid.

Although self-storage unit renters are typically careful to secure their goods, in a large facility with hundreds of renters there are likely to be a fair number of instances, every month, of a renter forgetting to lock his unit when he has completed his tasks at the facility and is prepared to leave. This, of course, leaves the storage unit vulnerable to thievery. Every instance of thievery lowers the reputation of the facility and results in a certain amount of extra work for the manager.

It is an unfortunate truth of the self-storage industry that some facility managers engage in thievery. Although the tenant places his own lock on a unit, a manager may be quite knowledgeable about locks and may know how to pick a lock, or even have another key that works for the lock, in his collection of locks and keys that are used for over locking units. Accordingly, many renters would appreciate some additional assurance that their goods are safe from a thieving manager when locked in the storage unit.

Thieves that break into storage lockers by cutting off the lock constitute another problem for storage facility owners, operators and renters. Addressing this problem, locks that include an alarm mechanism that makes an audible sound or transmits a radio frequency signal are known in the prior art. There could be a problem in the use of these locks in a facility with hundreds of locked units, however, because it would not be immediately evident which lock was producing the alarm signal.

Another problem encountered in the self-storage industry is that of renters losing their keys. Because a key to a rental unit is not an item that would typically be used on an everyday basis, many renters may place this key in a location that is subsequently forgotten. When this happens, the lock must be cut off the storage unit, creating more work for the facility manager and an unwanted expense to the renter.

SUMMARY

A method will be described for controlling access to a storage unit using an overlock assembly including a processor operably connected to a transceiver and an actuator linked to a moving arm. The method may comprise payment by a user of at least one periodic payment for access to the storage unit, recording each periodic payment in a computer with memory and a transceiver, the computer located remotely from the storage unit and the overlock assembly. Following a grace period initiated by the user failing to remit the periodic payment, a first coded signal may be transmitted from the computer to the overlock assembly and on receiving the first coded signal at the overlock assembly transceiver moving the arm of the overlock assembly to an overlock position to prevent access to the storage unit and operating the overlock assembly in an overlock state.

An overlock system for use with a secured space will also be described comprising a computer including a computer transceiver configured to send a first coded signal, computer memory for recording transactions and a program for recording scheduled periodic payments associated with the secured space by a user as well as an overlock assembly that includes an arm that moves between an overlock position and an open position, an overlock transceiver for receiving coded signals from the computer, a power supply and a logic unit operably connected to the power supply and the overlock transceiver. Following a grace period starting subsequent to a lapse in payments of the scheduled periodic payments the computer may generate the first coded signal and on receiving the first coded signal the overlock assembly operates in an overlock state and sets the arm to the overlock position preventing access to the secured space.

The foregoing and other objectives, features and advantages will be more readily understood upon consideration of the following detailed description, taken in conjunction with the accompanying drawings.

BRIEF DESCRIPTION OF THE DRAWINGS

FIG. 1 is a front view of a lock.
FIG. 2 is an interior view of the lock of FIG. 1.

DETAILED DESCRIPTION

Figure 3:
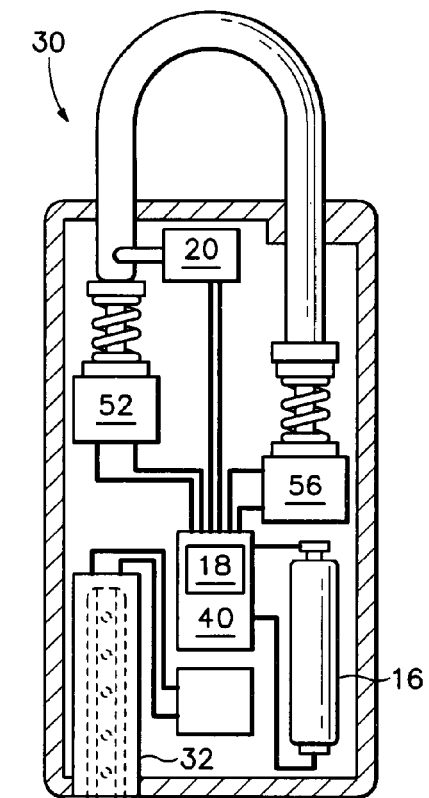
FIG. 3 is an another interior view of a lock.

FIGS. 1 and 2 show a combination lock 10, having a keypad 12, on the face of a lock body 14, adapted to accept and recognize a combination entered by a user. Keypad 12 is preferably a water-tight membrane dome type. The recognition task requires electric power, which may be provided by batteries 16. If the entered code matches a set code in a logic mechanism 18 and if the lock is in user controlled state (see below), a solenoid 20 retaining a shackle 24 is placed in a state that permits shackle 24 to be pulled outwardly from body 14, thereby freeing a shorter leg 50 of the shackle 24. Springs 26 urge the shackle 24 upwards into an open state. FIG. 3 is an electronic key lock 30 that uses a magnetic key reader 32 to read a magnetically encoded key 34. The following disclosure applies to lock 30 as well as lock 10 with all references to a "combination" modified to refer to a key 34.

As noted in the Background section, most self-storage facilities are operated on a month-to-month rental basis. Rent is typically due on the first of each month and in most American states, if the renter has failed to pay by the tenth day of the new month, the owner of the facility receives the right to deny the renter access to her storage unit. To facilitate this denial of access, the lock 10 includes an automatic lockout feature. A radio frequency (RF) transceiver 40, inside lock 10 is capable of receiving a coded message that places the lock 10 in a lockout or overlock state, wherein lock 10 remains locked even if the correct combination is entered into the keypad 12 and received by logic unit 18. If the lock 10 is in lockout state, the user, upon depressing any keypad key, is advised by a red light 44 that the lock 10 is in the lockout state and that he should see the facility manager, rather than attempting to unlock the lock 10. After the combination is entered a green light 42 advises the renter that the lock 10 is open.

Figure 4:
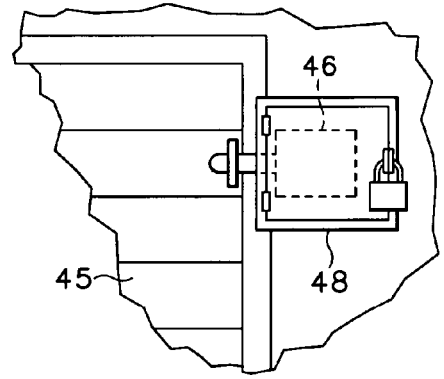
FIG. 4 is an illustration of a storage unit locking apparatus.

Referring to FIG. 4, the remotely controlled lockout system is implemented by a separate, remotely controlled, door lock 46. For example, a mechanism could be provided on the inside of a storage unit door 45 that could be automatically activated to prevent the door from opening. One advantage of having the lockout unit 46 placed inside the storage unit is that unit 46 could receive electrical power from the same source that powers the storage unit interior light. A separately lockable small door 48 could provide exterior access to unit 46.

Figure 4A:
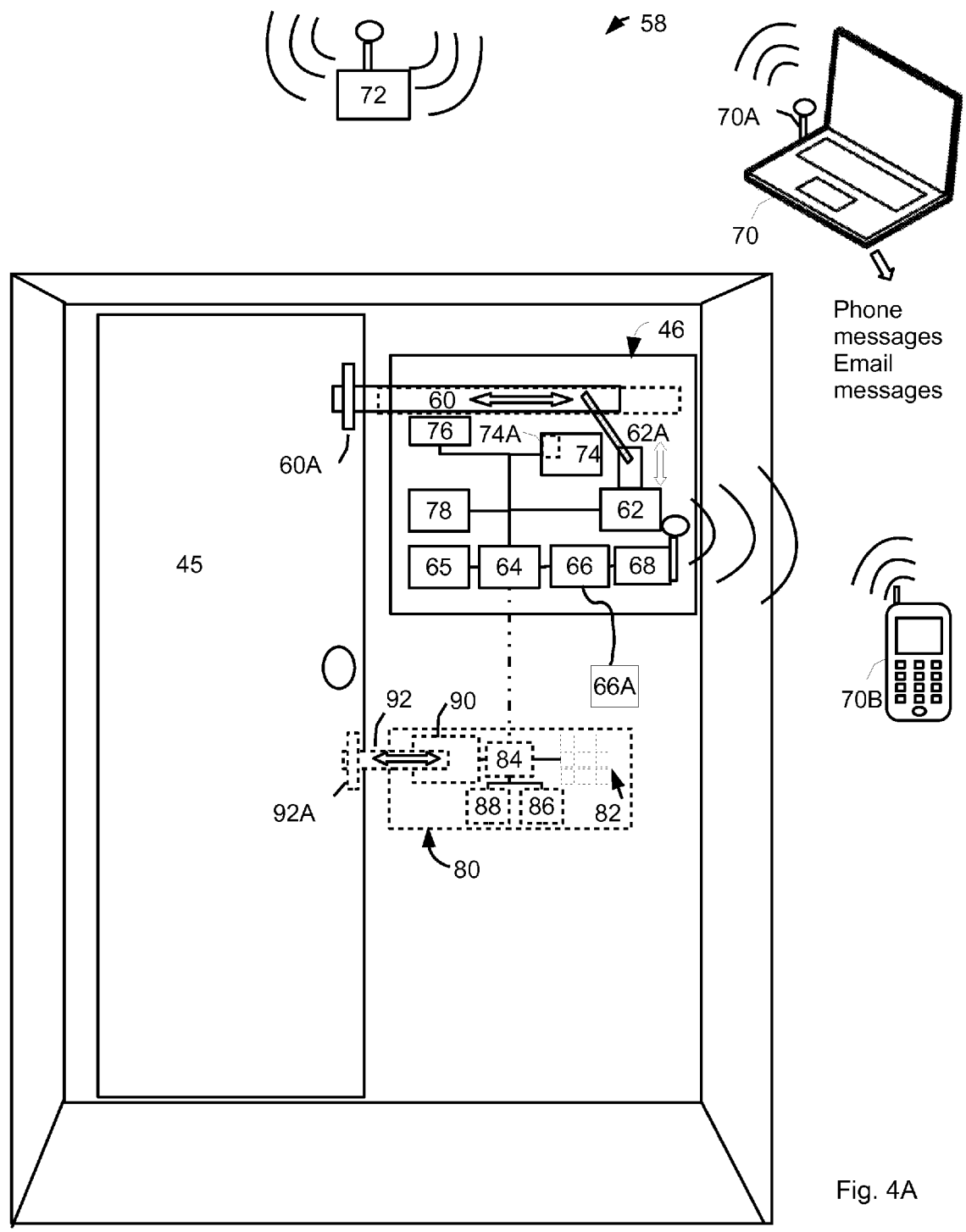
FIG. 4A is an illustration of an installed overlock system.

Referring to FIG. 4A a remotely controlled lockout system or overlock system 58 similar to FIG. 4 is illustrated in more detail. Door lock or overlock assembly 46 is shown with door 45 providing access to a secured space or rental storage unit. Overlock assembly 46 is shown here including an arm or moving arm 60 and an overlock solenoid or other actuator 62 coupled to arm 60 by a link 62A.

Operation of actuator 62 may move arm 60 between an open or disengaged position that allows entry to the storage unit and an overlock, secured or engaged position which engages a portion of door 45 such as a hasp, plate or receiver 60A. Arm 60 is shown moved to the overlock or engaged position from an open position which is indicated by the dotted lines. In the overlock position movement of door 45 relative to the storage unit is limited. Overlock assembly 46 may further include a logic unit or overlock processor 64 operably connected to actuator 62, overlock memory 65, a power supply 66 and a transceiver 68. Power supply 66 may include power storage such as a battery and may be connected to line power 66A in order to provide a charge to power supply 66.

FIG. 4A further includes a computer 70 with a computer transceiver 70A and a wireless modem or repeater 72. Transceiver 68 of overlock assembly 46 may be configured to communicate with computer 70 which runs a program recording transactions or periodic payments by users. Communication between computer transceiver 70A and overlock transceiver 68 may use radio frequency signals and some signals may be relayed between computer 70 and transceiver 68 by repeater or modem 72. Transceiver 68, repeater or modem 72 and computer transceiver 70A may use directional antennas to increase signal strength between communicating units. Overlock assembly 46 may operate in a user controlled state, an open state or an overlock state.

Overlock assembly 46 in response to a first signal from computer 70 may go into the overlock state with arm 60 in an engaged position. The first signal may be generated at the end of a grace period initiated by a scheduled periodic payment not being paid. The overlock state prevents user access to the storage unit when the appropriate fee for the storage unit is overdue. In response to a second signal from computer 70 overlock assembly 46 may go into the open state with arm 60 in an open position.

Signals between overlock assembly 46 and computer 70 may be coded signals. Where multiple overlock assemblies communicate with a single computer 70, coded signals may include an "address" or unique identifier for a specific overlock assembly. Each overlock assembly may be associated with one unique identifier. By sending a coded signal from computer 70 all overlock assemblies may receive the coded signal but only the specific overlock assembly associated with the unique identifier may respond to the coded signal. Coded signals may also incorporate security methods such as encryption to prevent unauthorized access to overlock system 46A.

Where overlock assembly 46 includes memory storing a code and a code interface as discussed below, and in response to a second coded signal overlock assembly 46 may operate in a user controlled state and arm 60 may remain in a locked position. While overlock assembly 46 operates in the user controlled state, when a user enters a code at the code interface that correlates to the code in memory, arm 60 may move to the open position.

Overlock assembly 46 may further include an override 74 that provides an alternate method for disengaging arm 60 from plate 60A in the case of equipment failure. Override 74 may comprise a locked door or panel as discussed above.

Alternatively or in addition, override 74 may be a key mechanism that on inserting a compatible key will disengage one or more elements retaining arm 60 in the engaged position. Arm 60 may be spring biased. Moving arm 60 to an engaged position may bias the spring means so that in response to disengaging any couplings or coupled elements, arm 60 will automatically move to the open position.

Alternatively or in addition, override 74 may be a manual override system. This may allow a user inside the storage unit to manually disengage or override the position of arm 60 from inside the unit and provide egress from the unit.

Overlock assembly 46 may include a position sensor 76 operably connected to processor 64 that responds to the position of arm 60 or cycling of arm 60 between the open position and the closed position. An access record with a timestamp may be created for each cycle of arm 60 and stored in memory 65. The access record may be transmitted as a coded position signal to computer 70. On receiving the coded position signal, computer 70 may generate a message to the user. The message may be an email as described above or may be a text or voice message to a telephone.

Alternatively or in addition, transceiver 68 may function as a cell phone. Repeater 72 may be a cell phone tower and overlock transceiver 68 may send coded signals to repeater 72 acting as a cell phone tower which then connects with computer 70, or a customer device such as computer 70B configured with cell phone functionality.

Overlock assembly 46 may further include a status sensor 78 operably connected to processor 64. Status sensor 78 may respond to motion, flame, heat, temperature, moisture, smoke or other stimulus. Status sensor 78 on detecting a stimulus may send a signal to processor 64. Processor 64 may then generate a coded status signal indicating an appropriate response is required.

Overlock assembly 46 may be used in conjunction with a user operated lock assembly or system 80. User operated lock assembly 80 is shown in dotted lines as it may be positioned on the outside of the storage unit. User operated lock assembly 80 as shown includes a lock processor 84 operably connected to a code interface 82, depicted here as a keypad, a lock power supply 86, lock memory 88 and a lock actuator 90. Lock actuator 90 may be connected to one or more lock arms 92. Lock arms 92 may move in response to operation of lock actuator 90 between open and locked positions. In a locked position arm 92 may engage a second plate or receiver 92A of door 45.

A user may enter an access code at code interface 82 that is compared to a code stored in lock memory 88. When the entered code and the stored code correlate, processor 84 may operate lock actuator 90. In response arm 92 may move to an open position to allow entry to the storage unit. Lock assembly 80 as shown here is an example. Lock assembly 80 could be any configuration that performs similar functions.

Lock 80 may be completely separate and operate independently from overlock assembly 46. For example, lock assembly 80 may be a mechanical padlock where a key or a combination is entered at code interface 82. The correct key or combination may cause lock arm 92 to move to an open position and allow entry to the storage unit while overlock assembly 46 is operating in the open state.

Alternatively, lock 80 may be partly or fully integrated into overlock assembly 46. Arms 60 and 92 may be a single unit. The functions of other components such as processors 64 and 84 may also be integrated into a single unit. Overlock assembly 46 may include code interface 82 and memory 65 may store a code. Actuators, links and arms of the lock and overlock can be implemented in a variety of configurations that are well known to those with ordinary skill in the art. Components used may include solenoids, piezoelectrics, screw drives, linear drives, motors, mechanical links and levers or no links at all. The configurations shown are examples for illustration.

While for the purposes of illustration lock assembly 80 is shown mounted on an outside surface, and overlock assembly 46 is shown on an inside surface, these systems can be located on door 45 on a wall, on an inside surface or an outside surface. Regardless of the placement, arms 60 and/or 92 when moved to secure or overlock positions limit relative movement between the storage unit and door 45. And while these examples may refer to a storage unit, this disclosure will apply to any secured space where a user pays periodic fees for access.

Figure 5:
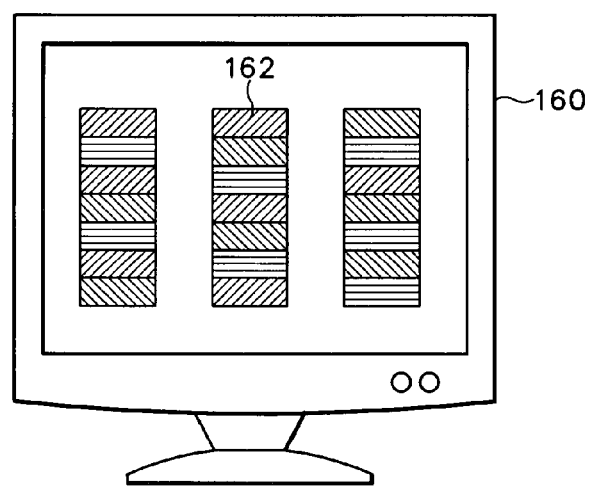
FIG. 5 is an illustration of a computer monitor display that shows graphics for programming and monitoring a storage facility.
Figure 6:
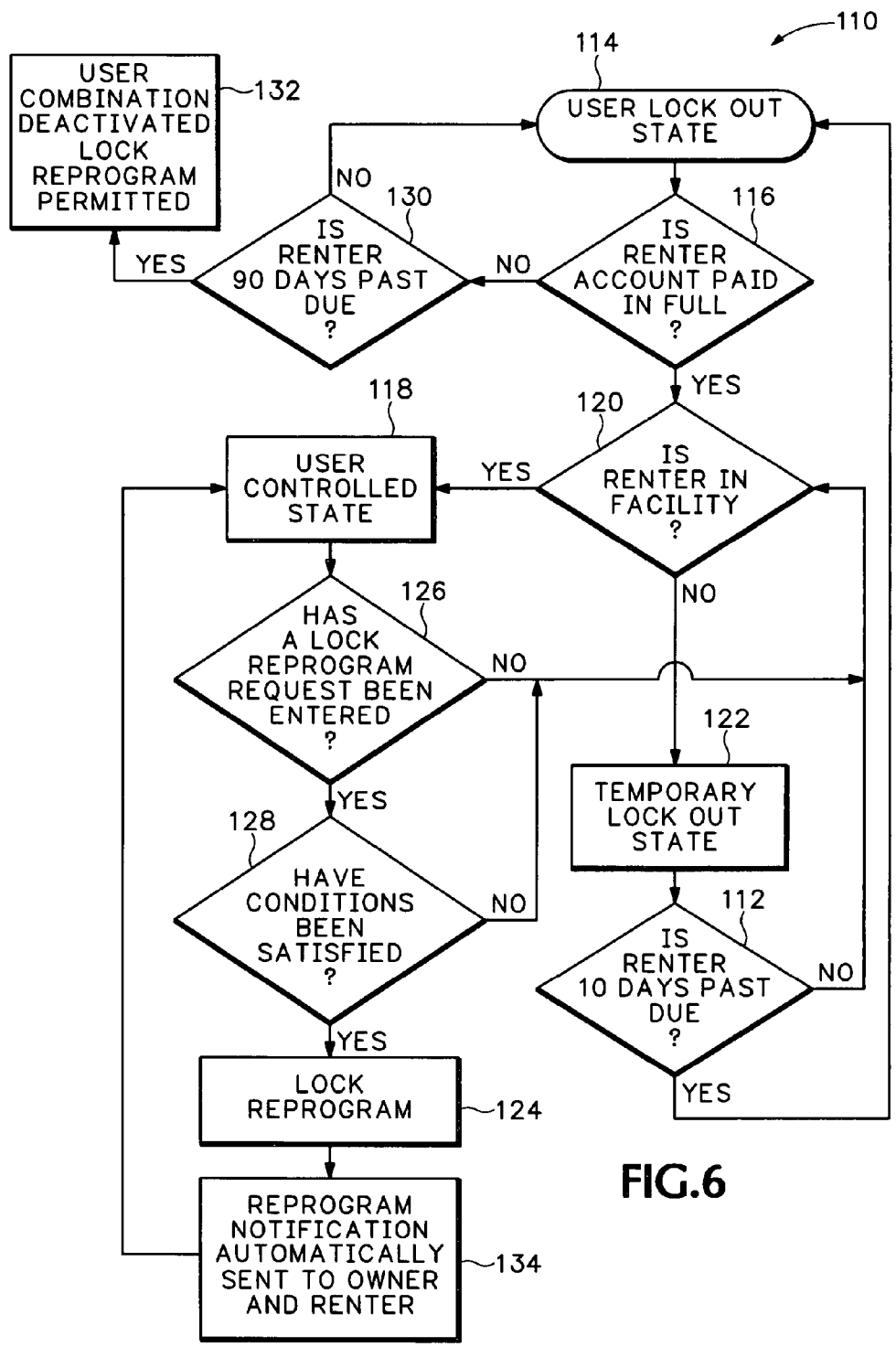
FIG. 6 is a flow diagram that describes, at least in part, operation of a locking system.

Currently, several computer programs are available for facilitating the management of a self-storage facility by, for example (see FIG. 5), displaying a map 160 of the facility with each unit 162 color coded to indicate its status, ie, whether the unit is rented out, whether the rent has been paid for month, etc. When a renter pays her rent for the month, this information is entered into the program and is immediately available. Referring to FIG. 6, which shows a flow chart of the remote station system logic 110, the computer automatically places in lockout state all of the units for which rent is delinquent (decision box 112, leading to lock out state block 114). When the renter subsequently pays her rent (decision box 116), the lockout state is changed to a user controlled state (state block 118), for as long as the renter is in the facility (decision box 120). Whenever the renter is not in the facility (as indicated by the gate entrance and exit keypads) the lock 10 is placed in a temporary lockout state (state block 122).

Lock 10 transmits a signal to the remote station. Every lock 10 sends a unique identifying code every time it communicates with the remote station, so that the remote station can associate the communication with the storage unit and renter. In one use of this lock 10 transmit capability, a message is sent advising the remote station when the lock 10 has been placed in an unlocked state and when it has then been placed into a locked state. If a unit is unlocked when the renter enters his keypad combination to leave the facility, he is automatically notified of this condition so that he can return to relock his unit.

Lock 10 may also have an alarm feature. A short arm 50 of shackle 24 touches a short arm switch 52 and a shackle long arm 54 touches a long arm switch 56. If both switches are opened, no alarm is given because this is a normal open state condition. But if the long arm switch 56 is opened while the short arm switch remains closed, then the shackle must have been cut (long arm 54 is urged outwardly by the spring action of switch assembly 52). In response an RF alarm signal, including the unique lock identifying code, is sent to the remote station.

Sometimes renters forget the combination, or in the case of a key lock, lose the key 34. In addition, there may be unforeseeable emergency reasons for needing to enter a storage unit, or the local police may serve a search warrant for a rental unit. In the past any such occurrence has typically resulted in the lock shackle being cut and a new lock being placed on the unit door. With lock 10, however, a new combination may be uploaded into lock 10 from the remote location by radio frequency (FIG. 6, block 124), thereby sparing the facility manager from the task of walking to the storage unit and cutting off the lock. A request for a lock reprogramming (decision box 126), may be followed up with some evidence to show that the renter has approved the request (decision box 128, see below). The reprogram feature could also be used to enable the facility manager to enter the unit in the event that the renter is so far behind in his rent payments that the owner has received the legal right to gain entry to the unit for the purpose of initiating sale of the renters possessions, in lieu of receiving rent payment (decision box 130). In this event, reprogramming would be permitted and the renter's combination would be deactivated (block 132).

The remote station's ability to change the combination to a lock 10 raises the possibility of a thieving manager changing the combination to a lock 10 for the purpose of being able to open the lock 10 and stealing unit contents. There are, however, a few natural safeguards against this sort of system abuse, as well as a few extra preventative measures that could be taken.

First, as each lock 10 is affirmatively over locked during facility closed times, the manager would have to enter the unit while the storage facility was open, potentially drawing attention to himself. Second, if the facilities manager were to change the lock combination for the purpose of illicitly entering the unit, he would have no way of knowing the renter's combination, so he would have no way of placing the lock 10 back into its original state. The tenant would then be unable to enter his unit and would realize that something was amiss.

Moreover, a log of all lock 10 activities is maintained at a secure location, so that it is unalterable by the facility manager. In one embodiment, one such log is maintained in the lock 10 itself. In yet another embodiment an Email or a page is automatically sent to both the owner and the renter (block 132) any time a lock 10 is reprogrammed to accept a new combination. If the renter has requested and or performed the reprogramming, this notice would come as no surprise and would not cause alarm. If the facility manager had reprogrammed the lock 10 without the renter's permission, however, the renter would likely invoke an investigation that would snare the thieving manager.

As an extra safeguard biometric data may be required for changing the key combination. For example, a finger print reader could be used to identify the renter. Alternatively, at the time of rental the renter enters into the computer a question and answer, such as, "what is the name of my dog," "Charlie." Any lock combination reprogram request is met with the question entered. If the correct answer is not entered into the computer in response, the lock 10 combination can not be changed. If the renter adequately identifies himself to the computer system, however, the now familiar ritual of cutting off a lock for which the key has been lost would no longer be necessary, saving time for both the renter and the facility manager. The renter need simply reprogram the lock from the remote station and then travel to the lock to apply the new combination.

Many advantages of the lock 10 should now be apparent. Using this lock, a storage facility can be converted to a facility in which every unit is alarmed, without the costly installation of a great number of alarm sensor and transmission units. Time is saved whenever it is necessary to lock renters out of their units, or to permit renter access after the rent has been paid. Any instance of an accidentally unlocked unit is brought to the attention of the facility manager. Because the locks are affirmatively over locked during periods when the facility is closed, a thieving manager would have to ply his trade during daylight hours. In order to provide these manifold advantages, however, lock 10 must be supplied with electric power. Batteries 16 are necessary for this purpose and the possibility of the batteries running down completely are anticipated in the embodiments. In one embodiment, a low power detector is included in the lock, and a signal, including an identification of the lock, is broadcast when a low battery condition is detected. In a related embodiment, if the batteries are permitted to run down, the lock 10 will remain in a locked state, unable to receive input from the key reader or keypad. The combination is stored in nonvolatile memory (typically electrically erasable programmable read only memory [EEPROM]), however, so that after the batteries have been replaced, the lock 10 may again be opened with the same combination as before.

The terms and expressions that have been employed in the foregoing specification are used as terms of description and not of limitation. There is no intention, in the use of such terms and expressions, of excluding equivalents of the features shown and described or portions thereof, it being recognized that the scope of the disclosure is defined and limited only by the claims which follow.

We claim:

1. An overlook system for use with a secured space comprising:
    a computer including:
        a computer transceiver configured to send and receive coded signals;
        a computer memory for recording transactions; and
        a program for recording scheduled periodic payments associated with the secured space by a user; and
    an overlock assembly including:
        an arm that moves between a closed position and an open position;
        a position sensor that responds to the position of the arm;
        an overlook transceiver for sending and receiving coded signals with the computer;
        a power supply; and
        a logic unit operably connected to the power supply, the position sensor and the overlook transceiver;
    wherein following a grace period starting subsequent to a lapse in payments of the scheduled periodic payments:
        the computer generates a first coded signal; and
        on receiving the first coded signal the overlook assembly operates in an overlook state preventing access to the secured space;
    wherein in response to movement of the arm between the open position and the closed position the computer generates a record with a timestamp.

2. The overlock system of claim 1 where the computer transceiver is further configured to send a second coded signal and on the user paying the periodic payment associated with the secured space:
    the computer generates the second coded signal: and
    on receiving the second coded signal the overlock assembly operates in an open state and sets the arm to the open position allowing access to the secured space.

3. The overlock system of claim 1 where the overlock assembly further includes overlock memory storing a code and a code interface where the computer transceiver is further configured to send a second coded signal and on the user paying the periodic payment associated with the secured space;
    the computer generates the second coded signal: and
    on receiving the second coded signal the overlock assembly operates in a user controlled state where in response to the user entering an access code at the code interface that correlates with the code stored in overlock memory the arm is moved to the open position.

4. The overlock system of claim 1 where the overlock assembly includes a stimulus sensor operably connected to the processor that responds to at least one stimulus selected from a stimulus group that includes heat, temperature, moisture, flame, motion and smoke.

5. The overlock system of claim 1 where the overlock assembly includes an override system accessed from outside the secured space that allows the arm to move to the open position.

6. The overlock system of claim 1 where the overlock assembly includes an override system accessed from inside the secured space that allows the arm to move to the open position allowing egress from the secured space.

7. The overlock system of claim 1 wherein in response to generation of the record stored in overlock memory the overlock transceiver transmits a coded position signal to the computer and in response to the coded position signal the computer sends a message to the user.

8. The overlock system of claim 1 where the secured space includes a door and while the overlock assembly operates in the overlock state the arm engages a portion of the door to prevent access to the secured space, and in the open state the arm is disengaged from the portion of the door.

9. A method for controlling access to a storage unit using an overlock assembly including a processor operably connected to a transceiver, a position sensor and an actuator linked to a moving arm, the position sensor responding to movement of the arm between an open position and a closed position, the method comprising:
    payment by a user of at least one periodic payment for access to the storage unit;
    recording each periodic payment in a computer with memory and a transceiver, the computer located remotely from the storage unit and the overlock assembly;
    following a grace period initiated by the user failing to remit the periodic payment, transmitting a first coded signal from the computer to the overlock assembly;

on receiving the first coded signal at the overlook assembly transceiver:
  moving the arm of the overlook assembly to an overlook position to prevent access to the storage unit; and
  operating the overlook assembly in an overlock state to prevent access to the storage unit; and
on movement of the arm creating a record of the arm movement with a timestamp.

10. The method for controlling access to a storage unit with an overlock assembly of claim 9 where moving the arm of the overlock assembly to the overlock position engages a hasp or plate of an access door and prevents relative movement of the access door and the storage unit.

11. The method for controlling access to a storage unit with an overlock assembly of claim 9 where the method further includes:
  in response to receiving a periodic payment, transmitting a second coded signal from the computer to the overlock assembly; and
  on receiving the second coded signal at the overlock assembly transceiver, moving the arm of the overlock assembly to an open position.

12. The method for controlling access to a storage unit with an overlock assembly of claim 9 where the overlock assembly further includes memory storing a code and a code interface operably connected to the processor where the method further includes:
  in response to receiving a payment, transmitting a second coded signal from the computer to the overlock assembly; and
  in response to receiving the second coded signal at the overlock assembly, operating the overlock assembly in a user controlled state where on a user entering an access code at the code interface that correlates to the code stored in memory the arm moves to an open position providing access to the storage unit.

13. The method for controlling access to a storage unit with an overlock assembly of claim 9 where the overlock assembly further includes a status sensor operably connected to the processor that responds to at least one stimulus selected from a group including motion, smoke, heat, temperature, moisture and flame, where the method further includes sending a coded status signal from the overlock assembly transceiver to the computer in response to the status sensor detecting the stimulus.

14. The method of controlling access to a storage unit with an overlock assembly of claim 9 where the method further comprises:
  in response to creating the record of the arm movement with a timestamp, the computer generates message to the user.

* * * * *